US005285506A

United States Patent [19]
Crooks et al.

[11] Patent Number: 5,285,506
[45] Date of Patent: Feb. 8, 1994

[54] METHOD OF RECORDING A HANDWRITTEN MESSAGE

[75] Inventors: John F. Crooks; Robert L. Protheroe, both of Cambridge, Ohio

[73] Assignee: NCR Corporation, Dayton, Ohio

[21] Appl. No.: 693,822

[22] Filed: Apr. 30, 1991

[51] Int. Cl.$^5$ .......................... G09G 3/02; G06K 9/00
[52] U.S. Cl. .......................................... 382/13; 382/3; 382/56; 345/174
[58] Field of Search ............... 382/3, 13, 59, 56, 3, 382/13, 59, 56; 340/706, 707

[56] References Cited

U.S. PATENT DOCUMENTS

| | | | |
|---|---|---|---|
| 4,308,522 | 12/1981 | Paganini et al. | 340/146.3 SY |
| 4,364,024 | 12/1982 | Paetsch | 340/146.3 SY |
| 4,542,412 | 9/1985 | Fuse et al. | 358/260 |
| 4,809,195 | 2/1989 | Bechet | 382/3 |
| 4,817,034 | 3/1989 | Hardin, Sr. et al. | 382/13 |
| 4,829,583 | 5/1989 | Monroe et al. | 382/13 |
| 4,878,249 | 10/1989 | Mifune et al. | 382/13 |
| 5,012,521 | 4/1991 | Endo et al. | 382/13 |
| 5,121,442 | 6/1992 | Togawa et al. | 382/13 |

Primary Examiner—Leo H. Boudreau
Assistant Examiner—Christopher S. Kelley
Attorney, Agent, or Firm—Biebel & French

[57] ABSTRACT

A method of capturing the coordinates of a handwritten signature and compressing the coordinate data so obtained. The signature is captured in real time by a device such as a stylus-operated digitizer. Compression is performed by examining the location of the signature points relative to a series of guide lines extending in the strokewise direction. The data is stored in compressed form for use in subsequent transactions requiring authorization by the signature which has been so captured.

10 Claims, 11 Drawing Sheets

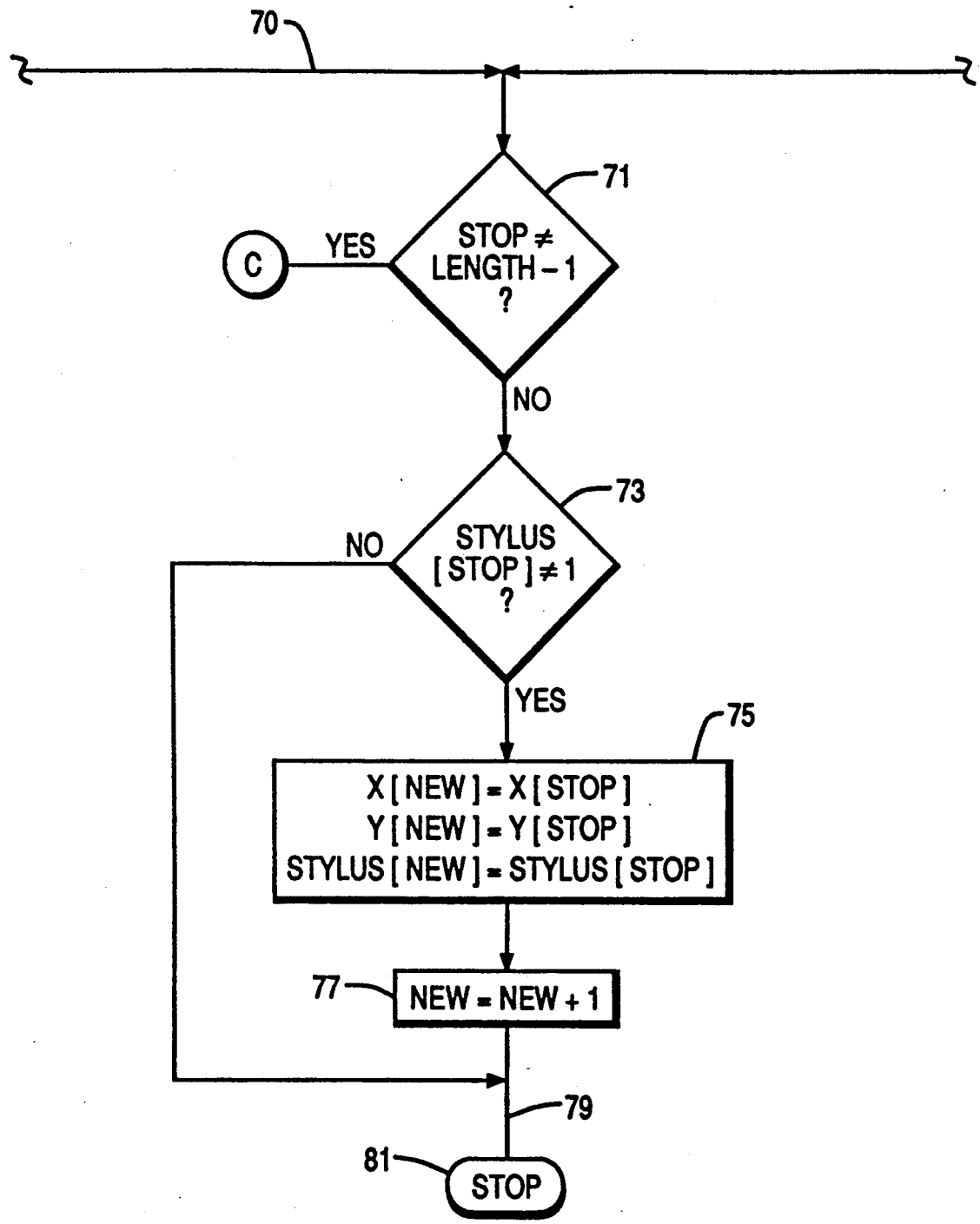

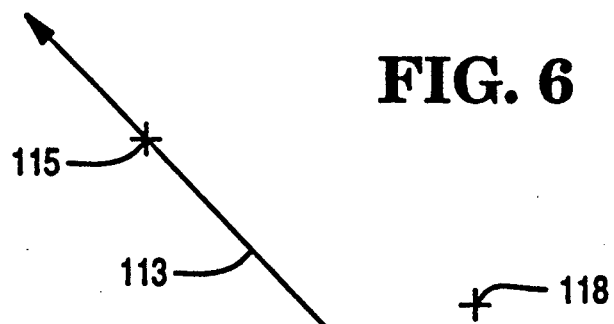
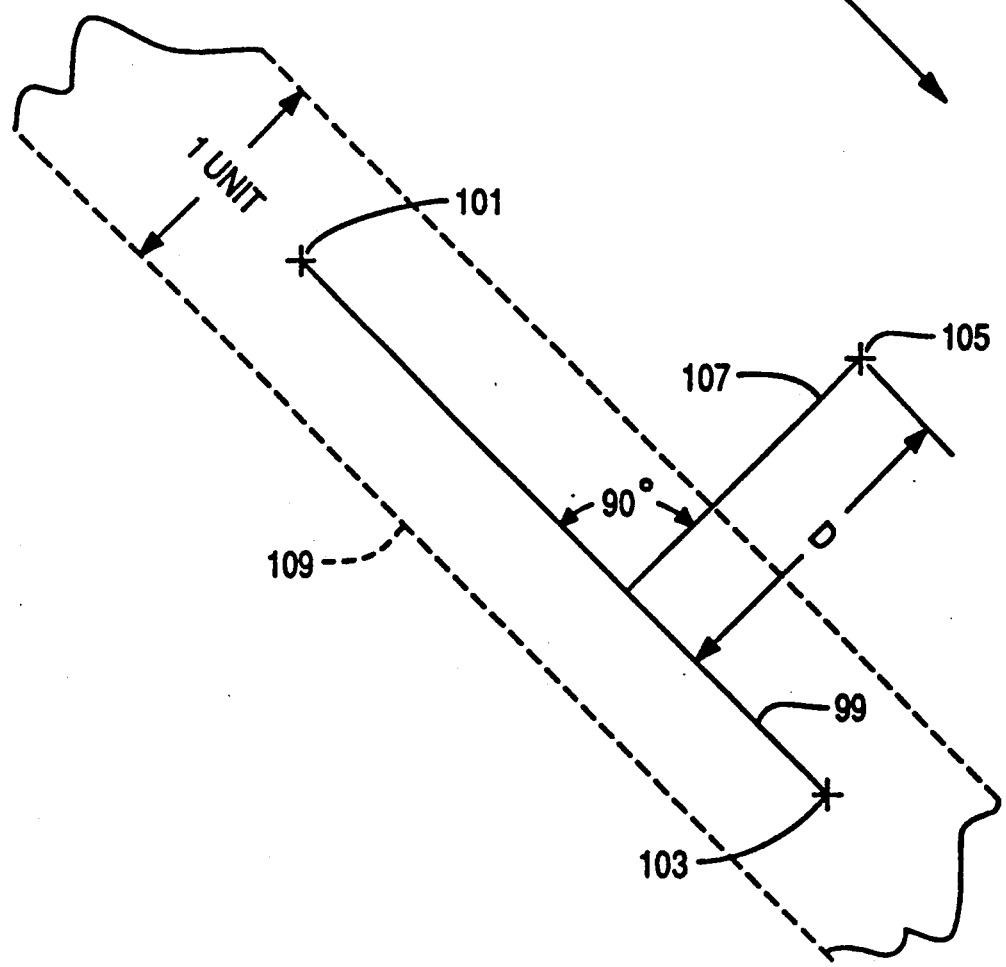

METHOD OF RECORDING A HANDWRITTEN MESSAGE

BACKGROUND OF THE INVENTION

This invention relates to a method of recording a handwritten message such as a signature in digitized form. It has particular application to commercial transactions wherein a handwritten signature is captured at a point of sale and is stored for later use to authenticate the transaction, authorize an automatic account debit or the like. The invention is particularly well suited for use with merchandising systems of the type disclosed in Allgeier et al, application Ser. No. 575,096, filed Aug. 30, 1990 and in Kapp et al, application Ser. No. 640,199, filed Jan. 11, 1991, the disclosures of which are incorporated herein by reference.

Merchandising systems as described in the above-mentioned patent applications are equipped with a transparent glass screen having a resistive coating fused to its surface. A linearized voltage field is established on the surface of the screen. A human signature is captured by providing a hand-held stylus which is moved across the surface of the screen during writing of the signature. A digitizer senses the position of the stylus during writing of the signature and generates digital signals representing the X-Y coordinates of the stylus. The digitized coordinates are stored in a memory and are also used to drive a liquid crystal display positioned below the glass screen. This produces a visual display of the signature, as the handwriting progresses. Means are provided for maintaining the signature in registration with the movement of the stylus, as disclosed in detail in the above-mentioned patent applications. Preferably, a skew correction is employed in the signature registration as disclosed in Crooks et al, Ser. No. 640,321, filed Jan. 11, 1991, also incorporated herein by reference.

The system of the above applications preferably includes a work station such as an NCR 7052 Work Station equipped with a built-in microprocessor and a keyboard for entering transaction data. A printer may be provided for printing transaction data and a replica of the signature on a suitable paper receipt.

SUMMARY OF THE INVENTION

The present invention provides a method of recording a signature by sensing the writing of the signature and generating a series of positional coordinates in digital format. The digitized coordinate information is stored sequentially in an ordered arrangement as generated. Thereafter the stored data is strokewise compressed. Such compression improves the recording process by reducing the amount of memory required for storage of the resulting data file. This makes the signature record particularly adapted for use in subsequent merchandising, billing or fund transfer operations.

Strokewise data compression is accomplished by examining the coordinate data on a sequential basis in accordance with the ordered storage arrangement thereof. A digital computing device progressively selects start points and stop points and examines the coordinates of all midpoints situated therebetween. The computing device establishes guide lines between the start points and their associated stop points and selectively saves the coordinate data only for those midpoints which are not situated at predetermined locations relative to their associated guide lines. Midpoints which are situated at such predetermined locations are considered to be redundant and are discarded.

In preferred embodiment the computer selects the first data point as a start point and the second data point as a stop point. The stop point is moved progressively in a strokewise direction along the signature, and at each stop point position the computer examines all intervening midpoints. If all midpoints are found to be redundant, then the stop point is advanced one position, and all midpoints are again examined. Whenever a midpoint is found to be located beyond the bounds of redundancy, the coordinate data for the previous stop point are saved, and all coordinate data for midpoints between that saved stop point and the last start point are discarded. The "saved" stop point then becomes a new start point, and the stop point is again advanced.

In preferred embodiment the line which is established between each start point and the successively established stop points is a straight line. Also, in the preferred embodiment an X-Y rectangular coordinate system is employed and a "linear fit" rejection criterion is utilized. This criterion involves calculating the equation of a straight line between the start point and the stop point in terms of a slope and a Y-intercept. For each examined midpoint, the X coordinate thereof is substituted into the equation for the line, and the line equation is solved to determine a Y value. The calculation is performed using floating point arithmetic, and the result is converted to an integer. If the resulting integer value of Y is equal to the Y coordinate of the point being examined, then the rejection criterion is satisfied. An alternative embodiment of the invention utilizes a rejection criterion which is based upon a calculated perpendicular distance between a midpoint under examination and a straight line between the start point and the stop point.

In the preferred embodiment of the invention the coordinate data for the signature points are scaled prior to performance of the compression routine. Scaling is performed by multiplying all coordinate data by a preselected constant. The scaling factor represents a desired reduction in resolution for the resulting data.

It is therefore an object of the invention to provide an improved method of recording handwritten signature information in digital form.

It is another object of the invention to provide a method of compressing data representing a handwritten signature.

Other and further objects and advantages of the invention will be apparent from the drawing, the following specification and the appended claims.

BRIEF DESCRIPTION OF THE DRAWINGS

FIGS. 5A through 5E are a flowchart for a digital computer program which reads, compresses and stores signature data.

FIG. 6 is a schematic illustration of a linear fit criterion for discarding midpoint coordinate data.

FIG. 7 is a schematic illustration of a trigonometric criterion for discarding midpoint coordinate data.

DESCRIPTION OF THE PREFERRED EMBODIMENT

Figure 1:
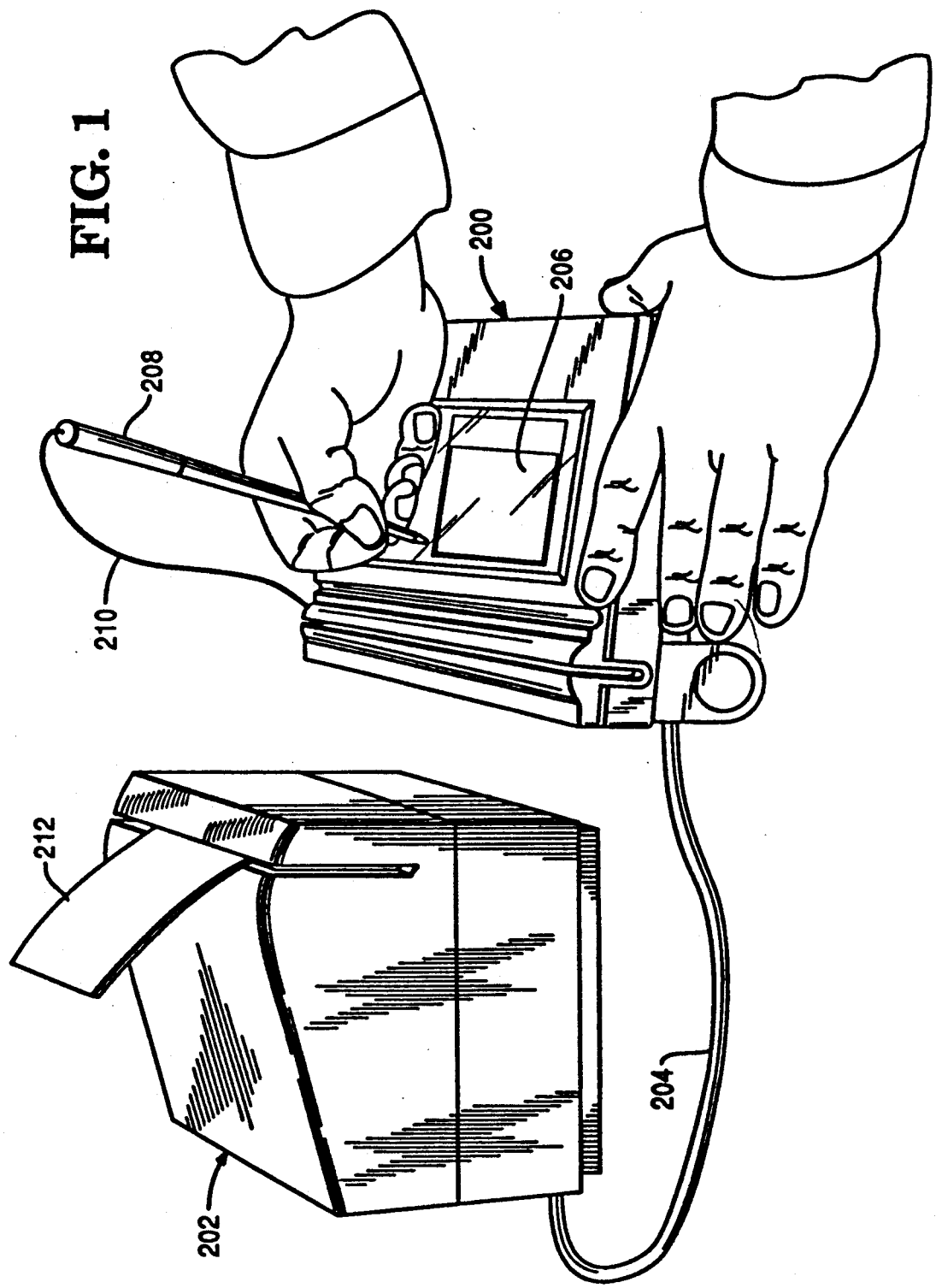
FIG. 1 is a perspective view of a write input apparatus and its associated printer.

Reference now is made to FIG. 1 wherein there is shown a perspective view of a write input apparatus 200 which is coupled to a printer 202 by a cable 204. Cable 204 may also connect printer 202 to other point-of-sale devices as disclosed in detail in Kapp et al., Ser. No. 640,199. A hand-held stylus 208 is connected to write input apparatus 200 by a suitable electrical line 210. Stylus 208 may be grasped by a human participant and brought into contact with a glass screen 206. Stylus 208 is held in contact with the glass screen 206 while the human participant makes a handwritten signature.

A resistive coating is fused upon the surface of glass screen 206 and a linearized voltage field is applied thereto. A digitizer 201 (FIG. 3) installed within write input device 200 senses the position of the stylus tip relative to screen 206 and generates a corresponding sequence of digital data bytes. These data bytes carry 8-bit binary codes representing the X-Y coordinates for a series of sequentially written signature points; each signature point being displaced from its neighbors along a line running in the strokewise direction (i.e. in the direction of the path traveled by the stylus).

Figure 2:
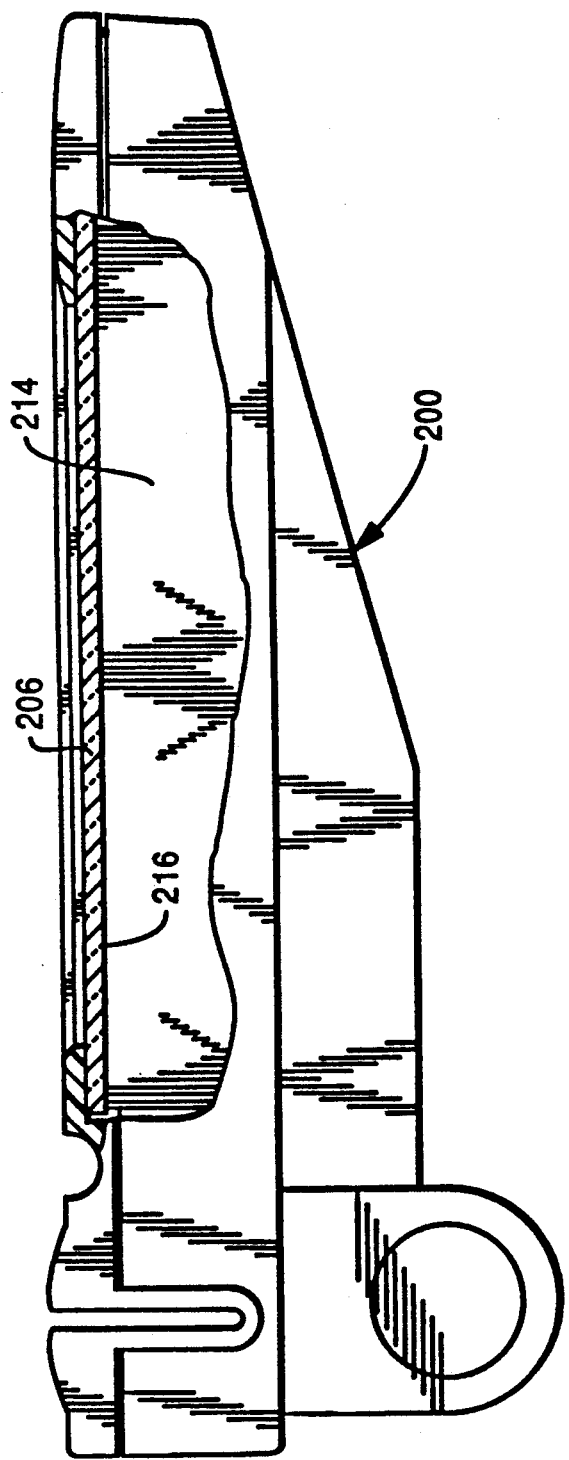
FIG. 2 is a partially sectioned elevational view of the write input apparatus of FIG. 1.

As illustrated in FIG. 2, a liquid crystal display unit 214 having a display surface 216 is positioned below the surface of the digitizer screen 206. The screen 206 is transparent, so that a display presented on surface 216 of LCD 214 may be observed therethrough. Positional coordinate information from digitizer 201 is applied to LCD 214 for creating a visual image of the progressively written signature. The signature coordinate information is also stored in a suitable digital memory for further processing, as described in detail below.

Figure 3:
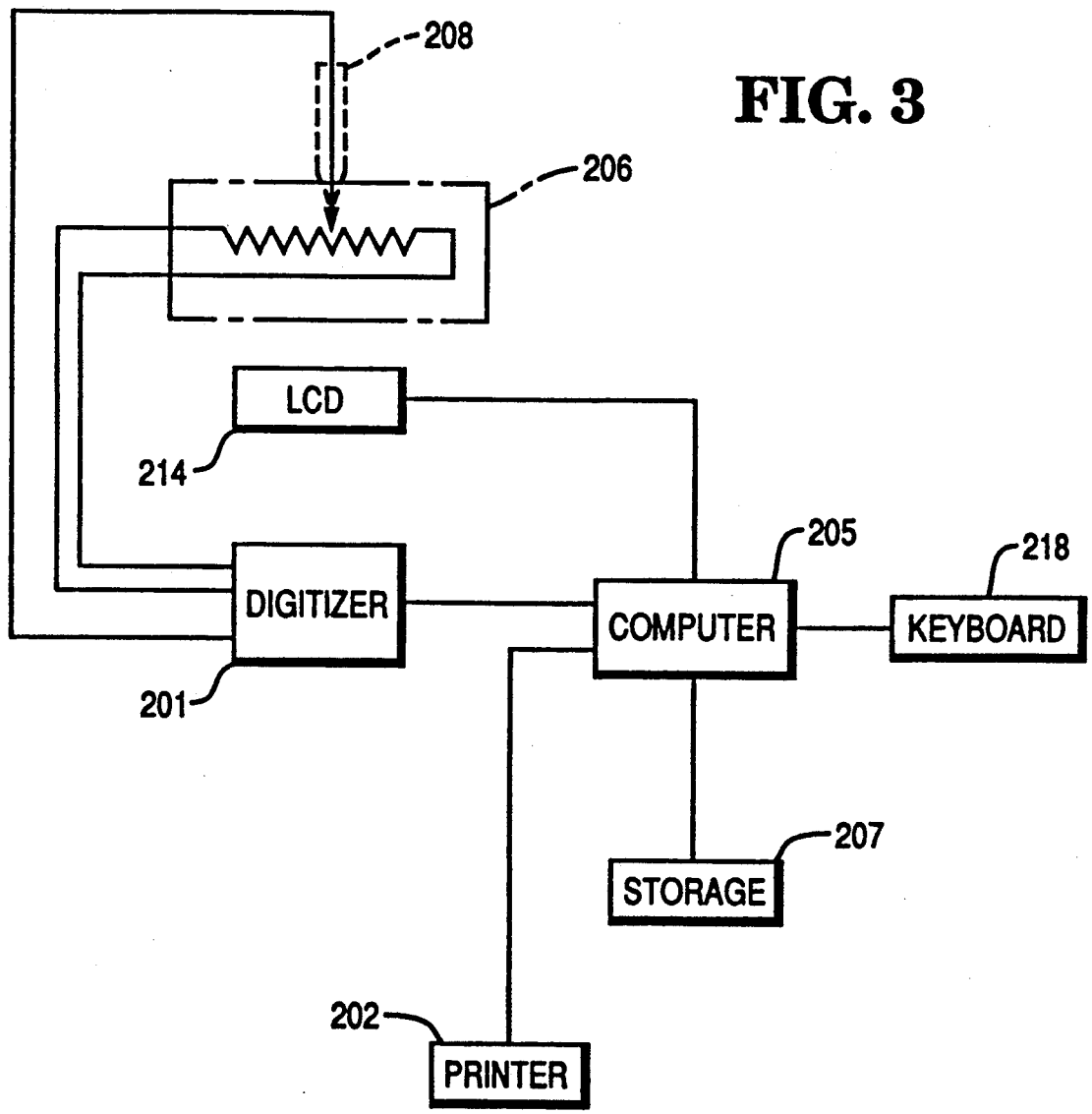
FIG. 3 is a block diagram of a signature recording system.

In the preferred embodiment of the invention digitizer 201 is a Scriptel RDT Sillo-ette ™ Model 1212. As illustrated in FIG. 3 digitizer 201 sends stylus position and status information via a serial RS232 link to the COM1 serial port of a digital computing device 205. A suitable device for this purpose is an NCR PC810 personal computer, but other personal computers may be used. Computer 205 generates image control signals for LCD 214 and print control signals for printer 202. A keyboard 218 supplies transaction information to computer 205.

Digitizer 201 captures stylus positional information for a series of discrete points at regularly timed intervals. These time intervals are short enough to capture a high quality record of a fast-moving handwritten input. A digitizer of the above mentioned type is capable of capturing a rapidly written signature at a resolution of 1,000 dots per inch (dpi). However, a resolution of only about 75 dpi is satisfactory for many signature recording requirements, and therefore the system may generate redundant data. The amount of such redundant data will be increased if the handwriting proceeds at a slow pace. The redundant signature data is discarded as hereinafter described, and the data which remains is stored in a digital storage device 207 such as a conventional floppy disk.

The serial data generated by a digitizer of the above-mentioned type is organized into 7-byte messages, each representing a single position/status report for the stylus. Message organization is as shown in Table I below:

TABLE I

| Byte | bit 7 | bit 6 | bit 5 | bit 4 | bit 3 | bit 2 | bit 1 | bit 0 |
|---|---|---|---|---|---|---|---|---|
| 1 | 1 | ST1 | ST2 | PA | PB8 | PB4 | PB2 | PB1 |
| 2 | 0 | 0 | 0 | 0 | 0 | SGN | X15 | X14 |
| 3 | 0 | X13 | X12 | X11 | X10 | X9 | X8 | X7 |
| 4 | 0 | X6 | X5 | X4 | X3 | X2 | X1 | X0 |
| 5 | 0 | 0 | 0 | 0 | 0 | SGN | Y15 | Y14 |
| 6 | 0 | Y13 | Y12 | Y11 | Y10 | Y9 | Y8 | Y7 |
| 7 | 0 | Y6 | Y5 | Y4 | Y3 | Y2 | Y1 | Y0 | where:
- X0–X15 form the x-position coordinate value. X15 is the most significant bit, while X0 is the least significant bit.
- Y0–Y15 form the y-position coordinate value. Y15 is the most significant bit, while Y0 is the least significant bit.
- SGN is the sign of the value which follows. SGN=0 indicates a positive value while SGN=1 indicates a negative value.
- PA is a flag bit which indicates what type of input device is being used with the digitizer (puck, stylus, etc.). It is equal to 0 when a stylus is being used.
- PB2, PB4, and PB8 are not used for the stylus input device.
- PB1 indicates the state of the stylus tip switch. When the stylus is pressed against the digitizer tablet, PB1=1. When the stylus is not pressed against the digitizer tablet, PB1=0.
- ST1 and ST2 are proximity flags. When the stylus is close enough to the digitizer pad to sense stylus position, ST1=ST2=0. When the stylus is too far away from the pad to sense stylus position, ST1=ST2=1.

Figure 4A:
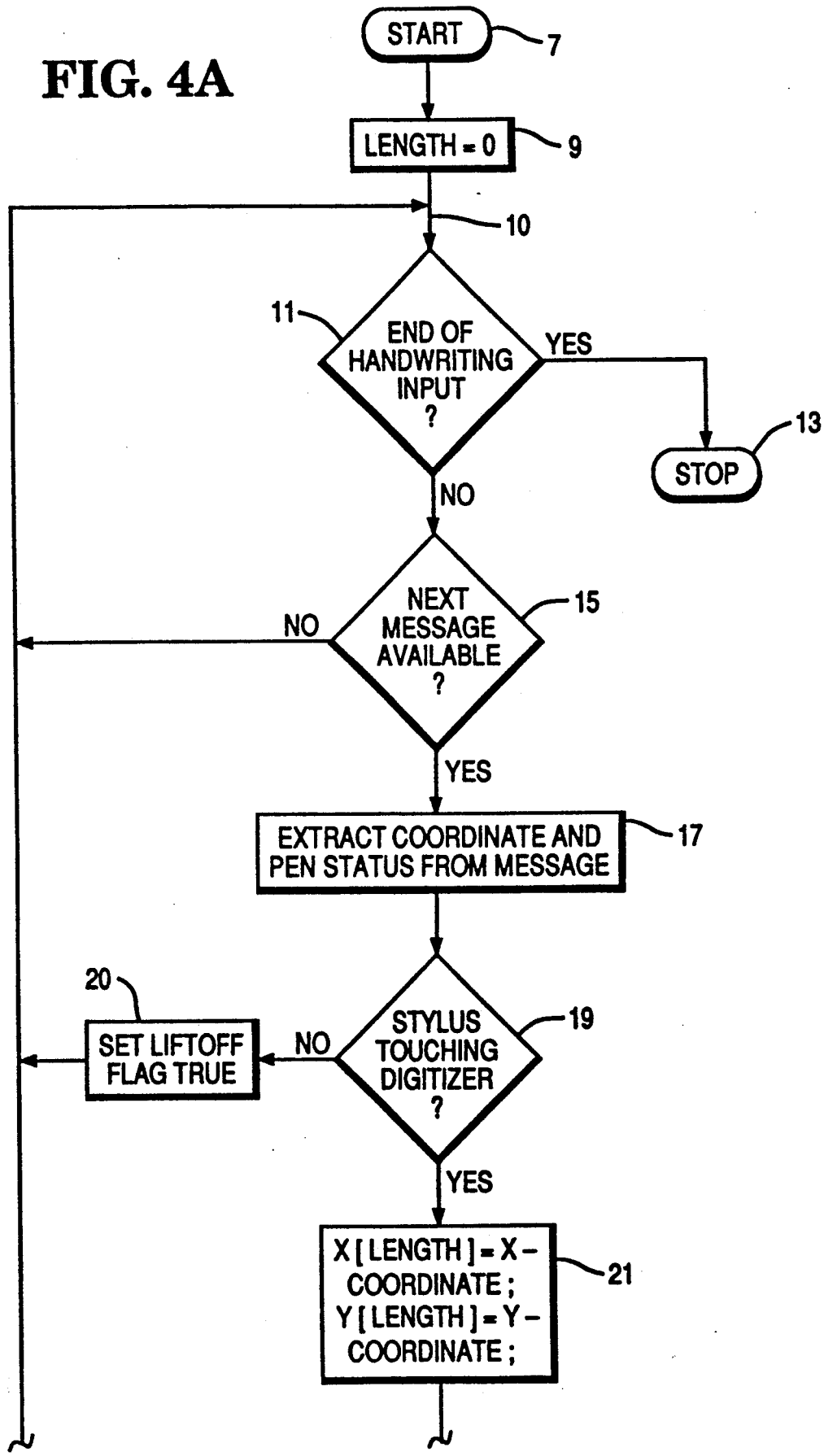
FIG. 4A and 4B are a flowchart of a digital computer routine for capturing positional coordinates for a handwritten signature.
Figure 4B:
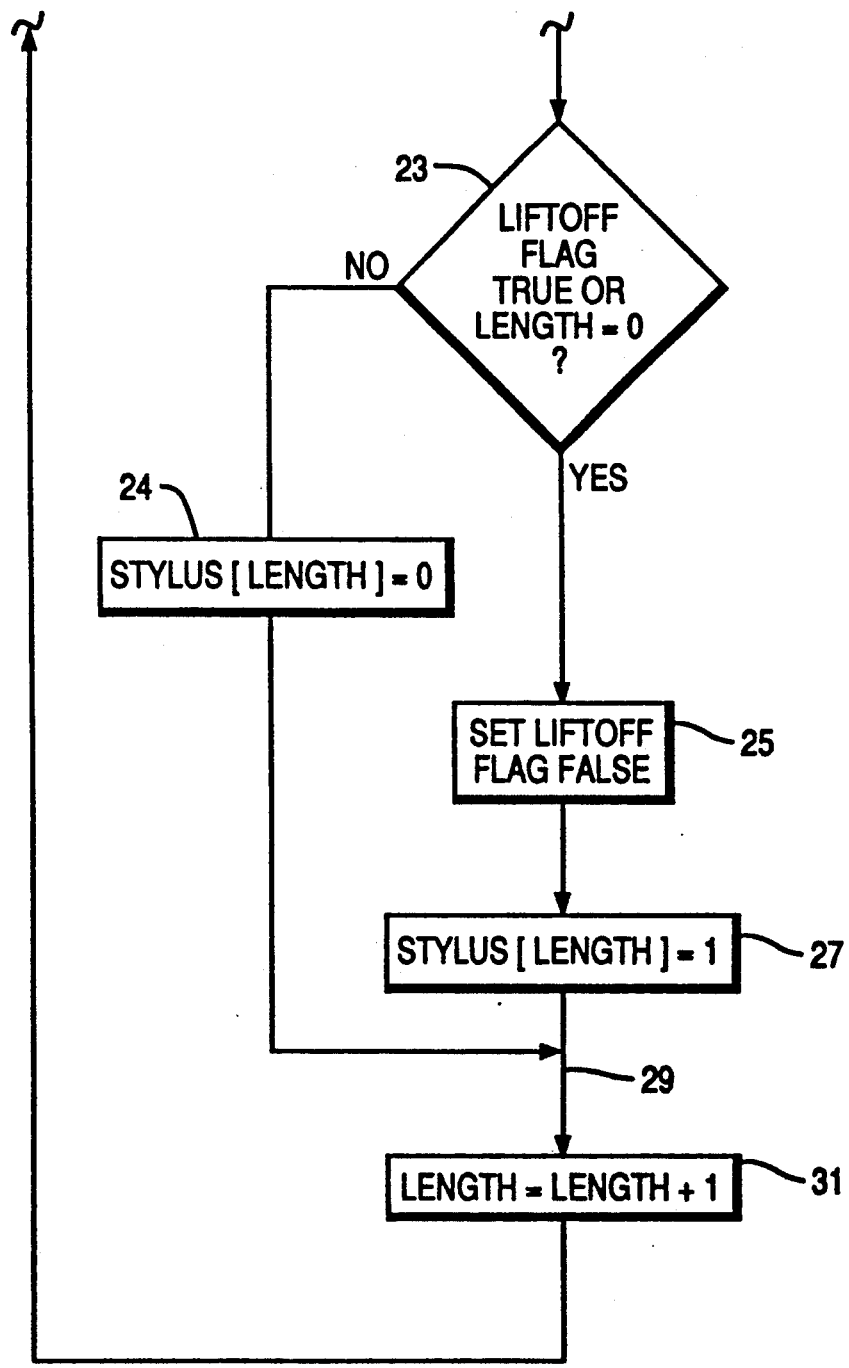

A computer program for capturing the signature data generated by digitizer 201 may be written to follow the flowchart of FIGS. 4A and 4B. Such a program may store the digitizer data in three arrays as follows:

(1) "x[n]", which is the horizontal position or x-coordinate of a data point.
(2) "y[n]", which is the vertical position or y-coordinate of a data point.
(3) "stylus[n]", which provides stroke information. "stylus[n]=0 indicates that point n is part of a continuing stroke; that is, the stylus was in contact with the digitizer surface at point n−1. "stylus[n]=1 indicates that point n is at the beginning of a new stroke.

The value of the variable n begins at 0 and is incremented for each new data point. The program uses an integer known as "length" which has an initial value of 0 and which progressively increases until it reaches a value equal to the highest value of n plus 1. Thus, "length" takes on a value equal to the total number of data points. Each of the above-mentioned arrays contains data for "length" points after completion of the sequence illustrated in FIGS. 4A and 4B. It is common programming practice to assign the value 0 to the first element of an array, so the index value for the last element of each array is equal to length−1.

Referring again to the flowchart of FIGS. 4A and 4B, execution starts at block 7 and then continues to block 9 where the variable "length" is initialized at a value of 0. This value is incremented as each new data point is read. The program performs a keyboard scan at decision point 11 to detect a keystroke indicating that the handwritten input is complete. If the input is complete, then the program exits to point 13. The value of "length" at that point in time is stored in memory as a constant.

If decision point 11 results in a conclusion that the handwritten input is not complete, then the program progresses to decision point 15 to determine whether the next message is available. If a complete message is not yet available, execution proceeds to node 10 and loops back through decision point 11 until a message is available. The program then continues to block 17 where x and y coordinates, as well as stylus status information, are extracted from the complete message via conventional bit manipulation. Reference may be made to Table I for guidance in the preparation of an appropriate bit manipulation routine.

Following extraction of coordinate data and stylus status information from the message, the program continues to decision point 19 where the BP1 bit of the current message is examined to determine whether the stylus is pressed against the digitizer tablet. If not, a flag known as the liftoff flag is set "true" (block 20). If the stylus is found to be touching the digitizer, then execution proceeds to block 21, where the x and y coordinate values are stored in the x and y arrays at index locations indicated by the current value of "length". Following this, an inquiry is made at decision point 23 as to whether the liftoff flag is set to a logical "true" OR if "length" is equal to 0. If either condition is true, execution continues to block 25, where the liftoff flag is set to a logical "false". Execution continues to block 27, where a "1" is stored in the "stylus[]" array at position "length", after which "length" is incremented at block 31. Execution then continues to node 10.

Returning to decision point 23, if neither the liftoff flag is set to a logical "true" nor is "length" equal to 0, execution proceeds to node 29 after setting "stylus[length]" equal to 0 in block 24. The specifics of implementing the above-outlined procedure will be readily apparent to anyone versed in personal computer programming.

After completing the procedure illustrated by the flowchart of FIGS. 4A and 4B, the method of this invention continues by compressing the data stored in arrays x[n], y[n] and stylus[n]. Compression proceeds on a strokewise basis, so that the data stored in the above-noted arrays is examined in the order in which it was stored. It will be appreciated that the stored data files may be examined in a reversed order or on a piecewise basis, either of which are equivalent to examination from beginning to end. All such equivalent examination sequences are referred to herein by the term "strokewise".

In accordance with the preferred embodiment of the invention, the compression involves two general phases, the first of which is a scaling phase. In this connection the program uses a variable "old_res" to refer to the resolution of the data as initially captured. Thus each count in x[n] and y[n] represents a distance of 1/old_res from the origin. The location of the origin is unimportant so long as all points are specified with reference to the same origin. A common point for the origin is the center of the digitizer panel, and old_res is determined by the digitizer pad used. For example, if the digitizer has a resolution of 1,000 dpi, each count in x[n] and y[n] initially represents a distance of 0.001 inches. A value of x[n] equal 500 therefore represents a horizontal distance of 0.5 inches from the origin, and a value of 250 for y[n] represents a vertical distance of 0.25 inches from the origin.

Reference is now made to FIGS. 5A through 5E which are a flowchart for the compression procedure. Variables used in this procedure are as follows:

1. "x[]" and "y[]" are arrays of length "length" which contain the horizontal and vertical coordinates respectively of each point in the handwriting record, as described previously. After compression, these arrays contain the horizontal and vertical coordinates of the compressed handwriting record.
2. "stylus[]" is an array of length "length" which contains the action of the stylus at the point specified by x[n] and y[n], as described previously. After compression, this array contains the stylus action for each point in the compressed handwriting record.
3. "length" represents the number of elements in the handwriting records, as described previously.
4. "new_res" is the handwriting record resolution after compression has been applied.
5. "old_res" is the handwriting record resolution before compression has been applied.
6. "new" is an array index which points to the next open position in either "x[]", "y[]", or "stylus[]" after the last point in the new, compressed handwriting record. For example, "x[new−1]" is the last x-coordinate in the handwriting record after compression. "new" is also equal to the length of the compressed handwriting record.
7. "start" is an array index used during compression.
8. "midpoint" is an array index used during compression.
9. "stop" is an array index used during compression.
10. "n" is an array index used during compression.

Figure 5A:
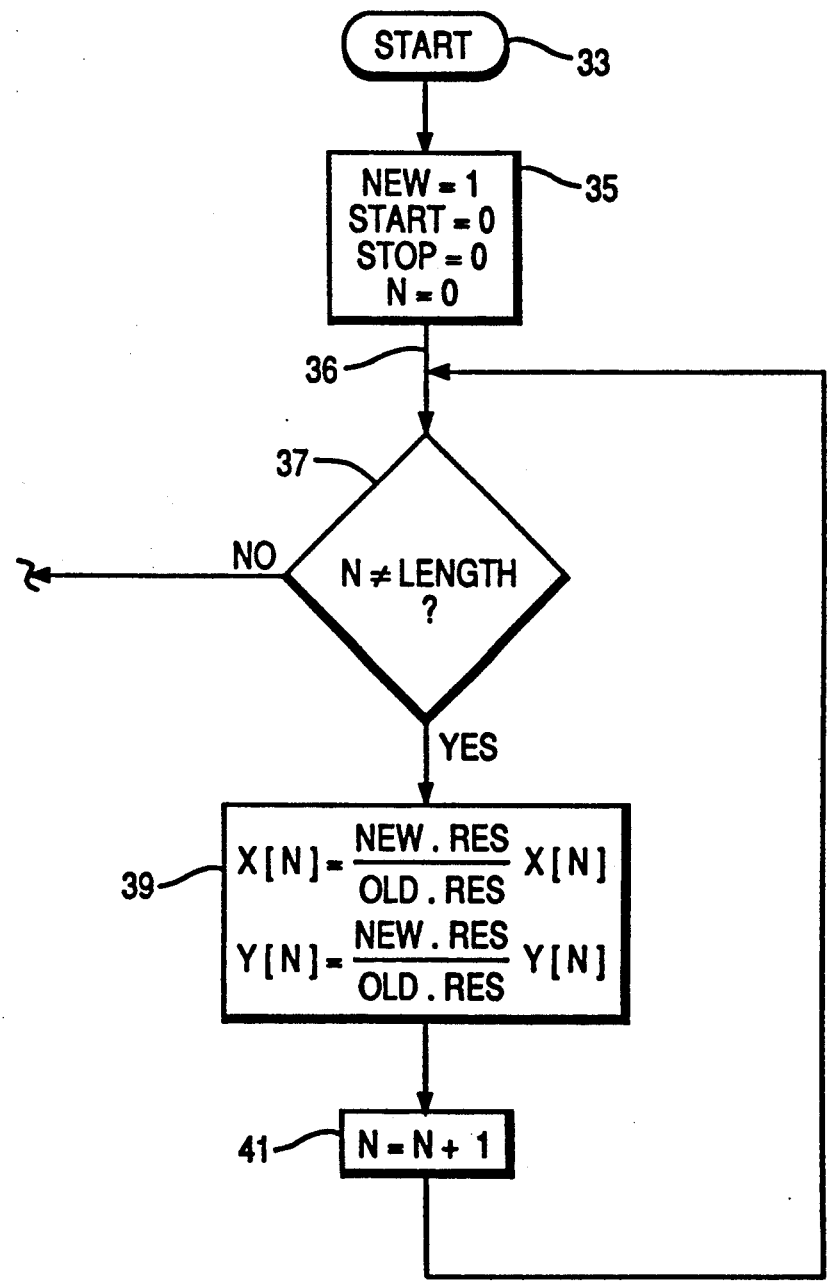
Figure 5B:
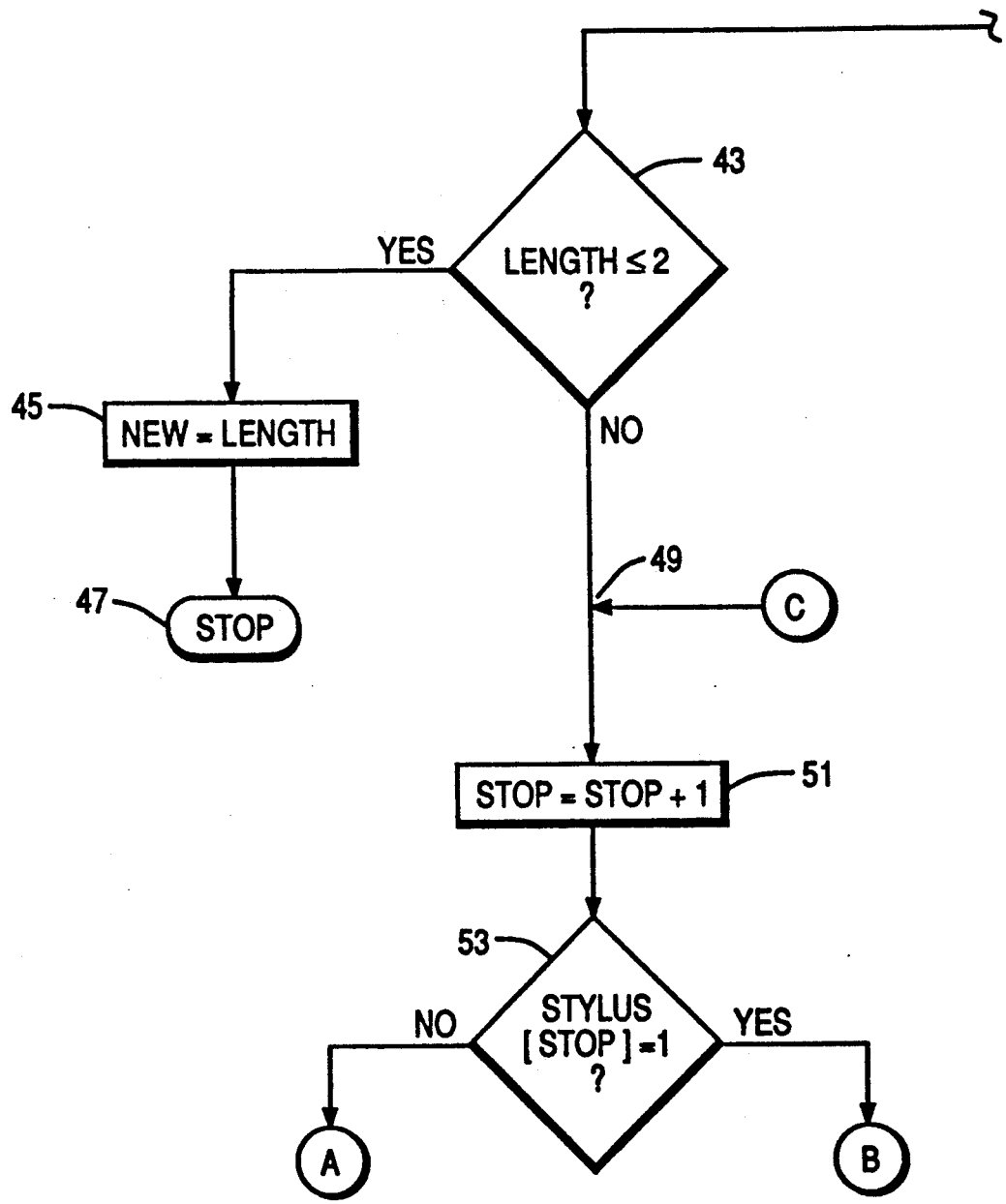

Referring to FIG. 5A, the procedure starts at block 33. The different variables used later on in the procedure are then initialized in block 35: "new" is set to 1, "start" is set to 0, "stop" is set to 0, and "n" is set to 0.

The procedure continues to decision point 37, where an inquiry is made as to whether "n" is not equal to "length". If so, the procedure continues to block 39, where the coordinates "x[n]" and "y[n]" are scaled to the new resolution, "new_res". This is done by multiplying each coordinate in turn by the scalar ("new_res"/"old_res"). Following this, "n" is incremented by one in block 41, and the procedure branches to node 36.

Returning to decision point 37, if "n" is not equal to "length", the procedure continues to decision point 43, where an inquiry is made as to whether "length" is less than or equal to 2. If so, there is no use trying to compress this handwriting record, as it is already as small as it could possibly be. In this case, the procedure continues to block 45, where "new" is set equal to "length". The procedure then terminates at block 47.

Returning to decision point 43, if length is not less than or equal to 2, the procedure continues to block 51, where "stop" is incremented by one. Following this, an inquiry is made at decision point 53 as to whether "stylus[stop]" is equal to 1. if not, this indicates that the presently processed point is a continuation of a previous stroke. In that case, the procedure continues to block 55, where "midpoint" is set equal to "start" plus one. An inquiry is then made at decision point 59 as to whether "midpoint" is not equal to "stop". If this is so, the procedure branches to node 70. Otherwise, the procedure continues to decision point 61, where an inquiry is made as to whether the point (x[midpoint], y[midpoint]) can be discarded.

Two different types of test have been employed to determine whether (x[midpoint], y[midpoint]) can be discarded. The preferred test is a linear fit test as illustrated in FIG. 6 for a midpoint 118. In this test, a linear equation for a guide line 113 connecting point 115 (x[start], y[start]) to point 117 (x[stop], y[stop]) is calculated. This linear equation takes the form Y=slope*X+intercept, where "Y" is a vertical coordinate along the line, "X" is the corresponding horizontal coordinate, and "slope" and "intercept" are constants calculated as follows:

$$slope = (y[start] - y[stop])/(x[start] - x[stop])$$

$$intercept = y[start] - slope * x[start]$$

Computer 205 calculates "slope" and "intercept" using floating point math and then solves the equation:

$$Y = slope * x[midpoint] + intercept$$

This produces an estimate for y[midpoint] in floating point format. The calculated value of Y is converted to an integer and compared to y[midpoint]. If the two values are equal, then point 118 is assumed to be located on or near guide line 113, and its coordinate data is (at this point) considered redundant. However, the coordinate data for point 118 are not discarded until after a strokewise subsequent point is found to be non-redundant and a new start point has been determined. This is discussed in more detail below.

The second type of redundancy test is a perpendicular distance test as illustrated in FIG. 7. In this test a guide line 99 is drawn between the points (x[start], y[start]) 101 and (x[stop], y[stop]) 103. The distance between guide line 99 and a midpoint (x[midpoint],y[midpoint]) 105 is measured along line 107 extending through point 105 and perpendicular to guide line 99. The length of line 107 is calculated via the equation:

$$D = l_{start-midpoint} * \sin(2 * acos(\sqrt{P * (P - l_{midpoint-stop})/(l_{start-midpoint} * l_{start-stop})}))$$

where:

$$l_{start-midpoint} = (("x[start]" - "x[midpoint]")^2 + ("y[start]" - "y[midpoint]")^2)^{\frac{1}{2}}$$

$$l_{midpoint-stop} = (("x[midpoint]" - "x[stop]")^2 + ("y[midpoint]" - "y[stop]")^2)^{\frac{1}{2}}$$

$$l_{start-stop} = (("x[start]" - "X[stop]")^2 + ("y[start]" - "y[stop]")^2)^{\frac{1}{2}}$$

$$P = (l_{start-midpoint} + l_{midpoint-stop} + l_{start-stop})/2$$

If guide line 99 is drawn such that it is one unit wide (as shown by the dotted line boundaries of the path 109), the point 105 will be encompassed thereby if D is less than or equal to ½. Therefore, if D is calculated as described above and found to be less than or equal to ½, the coordinate data (x[midpoint],y[midpoint]) for point 105 can be discarded.

The cutoff point for D need not be set to ½. The algorithm can be strengthened by making D less than ½ or weakened by making D greater than ½. Making the algorithm stronger will not make any noticeable difference in the appearance of the reconstructed handwritten figure. However, it will increase the length of the record. Making the algorithm weaker will decrease the length of the record but will degrade the reconstructed figure by making it appear as a series of discrete straight lines instead of a continuous curve.

Both the perpendicular distance method and the linear fit method offer satisfactory results, but the linear fit method has a clear advantage in that it is simpler and thus much faster. However, the perpendicular distance method has the useful feature of adjustable selectivity by varying the cutoff point for the distance d.

Figure 5C:
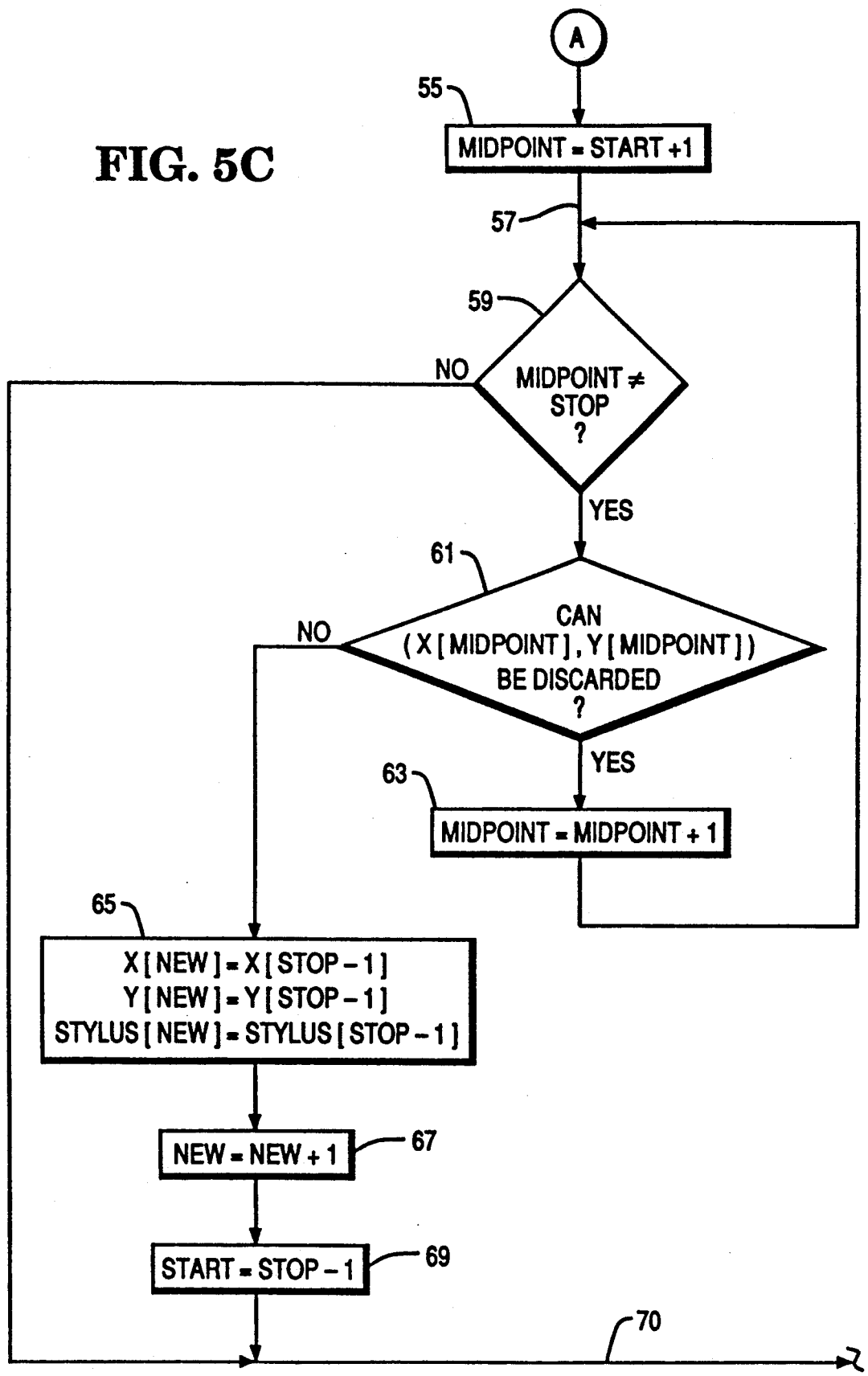
Figure 5D:
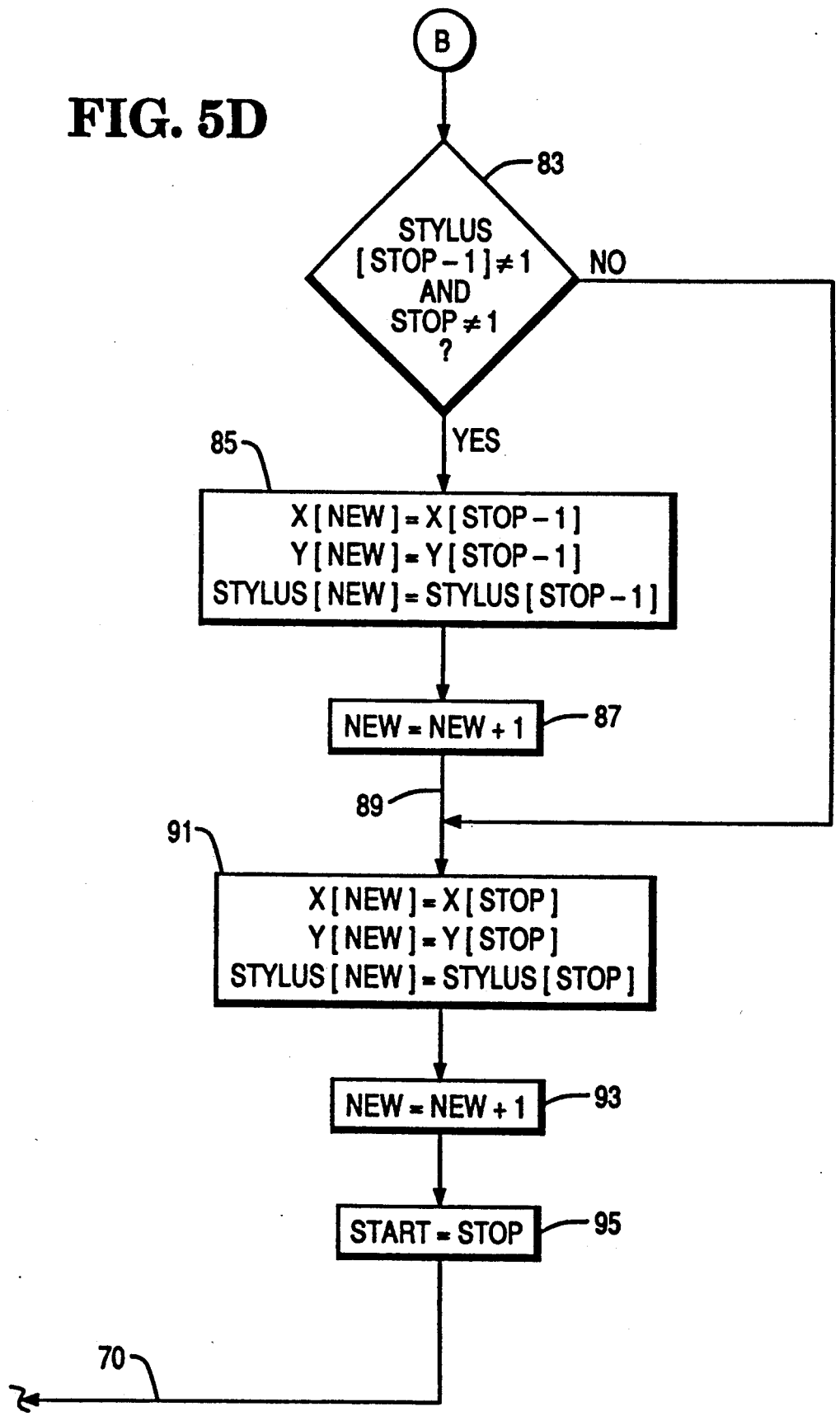

Returning to decision point 61 of FIG. 5C, if the point (x[midpoint],y[midpoint]) can be discarded, execution continues to block 63, where "midpoint" is incremented by one, and the procedure continues at node 57. Otherwise, the procedure continues to block 65. In block 65, the point indexed by "stop" minus 1 is stored in the compressed handwriting record by setting "x[new]" equal to "x[stop−1]", "y[new]" equal to "y[stop−1]", and "stylus[new]" equal to "stylus[stop−1]".

Following block 65, "new" is incremented by one in block 67 and start is set equal to stop−1 in block 69, following which the procedure continues to decision point 71. At decision point 71, an inquiry is made as to whether stop is not equal to length minus 1. If so, execution continues at node 49. If not, the entire handwriting record has been processed, and the procedure continues to decision point 73 where an inquiry is made as to whether stylus[stop] does not equal one. If not, the procedure continues to node 79 and then terminates at block 81. Otherwise, the point indexed by "stop" is added to the end of the compressed handwriting record in block 75 by setting "x[new]" equal to "[stop]", setting "y[new]" equal to "y[stop]", and setting "stylus[new]" equal to "stylus[stop]". New is then incremented by one in block 77 and the procedure continues to node 79.

Returning to decision point 53, if "stylus[stop]" is equal to one, the procedure continues instead to block 83, where an inquiry is made as to whether "stylus[stop−1]" is not equal to one and "stop" is not equal to one. If either condition is false, execution continues to node 89. Otherwise, execution continues to block 85, where the point indexed by "stop" minus one is stored in the compressed handwriting record by setting "x[new]" equal to "x[stop−1]", "y[new]" equal to "y[stop−1]", and "stylus[new]" equal to "stylus[stop−1]". "new" is then incremented by one in block 87. Following this, the point indexed by "stop" is stored in the compressed handwriting record by setting "x[new]" equal to "x[stop]", setting "y[new]" equal to "y[stop]", and setting stylus[new]" equal to "stylus[stop]". "new" is then incremented by one in block 93. Following this, the procedure continues to node 95, where "start" is set equal to "stop". The procedure then continues to node 70.

It is not necessary that the guide lines used in accordance with this invention be straight lines. It is also practical to determine the redundancy of a midpoint based upon its location relative to a curved guide line extending in the strokewise direction. Such a curved guide line may be generated, for instance, by computing the coefficients of a polynomial function passing through the stop point, the start point and one or more previous start/stop points. It could also be generated through use of a non-rectangular coordinate system. For example, a curved guide line could be constructed in a circular coordinate system as an arc of constant radius.

It is also apparent that a guide line may be projected beyond a stop point and used for checking the redundancy of "midpoints" which are beyond the stop point.

Furthermore, it is possible to generate the handwritten signature with the aid of devices other than a stylus-activated digitizer. For example, a mouse or a puck activated digitizer could be used.

While the methods herein described constitute preferred embodiments of this invention, it is to be understood that the invention is not limited to these precise methods, and that changes may be made therein without departing from the scope of the invention, which is defined in the appended claims.

What is claimed is:

1. A method of recording a handwritten signature comprising the steps of:

causing said signature to be written by a hand-held stylus, sensing the location of a series of signature points progressively traversed by said stylus during strokewise movement thereof, generating a stream of digital position data indicating the location of said signature points, storing said position data in an ordered arrangement corresponding to the sequence of said data within said stream, retrieving said position data from storage in a sequence related to the storage order thereof, designating one of said signature points as a start point, designating another one of said signature points as a stop point, using said position data to establish the positional relationship between a guide line extending through said start point and said stop point and other ones of said signature points which are strokewise intermediate said start point and said stop point, when said intermediate signature points all meet a predetermined positional criterion relative to said guide line, then designating a new stop point which is strokewise advanced from said previously designated stop point and repeating said last recited step until a stop point is reached for which an intermediate signature point fails to meet said predetermined positional criterion, designating one of said previously designated stop points as a new start point, designating one of said signature points which is strokewise advanced from said new start point as yet another new stop point, repeating said last six recited steps until all of said signature points have been designated as a stop point at least once, and selectively returning to storage only that position data corresponding to those of said signature points which were found not to have met said predetermined positional criterion at least once.

2. A method according to claim 1 wherein said position data is generated in the form of a sequence of bytes representing the coordinates of said signature points in a rectangular coordinate system.

3. A method according to claim 2 and further comprising the step of scaling said data prior to the return thereof to storage; said scaling step being performed by multiplying the coordinates for said signature points by a scale constant.

4. A method according to claim 1 and further comprising the step of calculating the equation of said guide line; a new stop point being designated if the coordinates of all signature points between the last designated start point and the last designated stop point satisfy said equation, reduced to an integer value.

5. A method according to claim 4 and further comprising the step of scaling said data prior to the return thereof to storage; said scaling step being performed by multiplying the coordinates of said signature points by a scale constant.

6. A method of recording a handwritten signature comprising the steps of:

sensing a pair of dimensional coordinates for each of a series of positions achieved during the writing of said signature, storing said coordinate pairs in a digital storage device in an ordered arrangement in accordance with the sequence in which said coordinate pairs are sensed, sequentially retrieving said coordinate pairs from said digital storage device in a strokewise order defined by said ordered arrangement, supplying said coordinate pairs to a digital computing device, operating said digital computing device to compute a positional relationship between midpoints represented by selected ones of said coordinate pairs and guide lines between other points represented by other ones of said coordinate pairs, said other points comprising a start point and a stop point strokewise displaced from said start point, repeating said operating step for new stop points, strokewise displaced from aforesaid stop point, until said positional relationship is not satisfied, repeating said operating step and said repeating step for a series of new start points comprising previously used stop points, using the results of said positional relationship calculations for selectively discarding certain ones of said coordinate pairs, storing in a digital storage device those of said coordinate pairs which have not been discarded as aforesaid.

7. A method according to claim 1 and further comprising the steps of calculating the perpendicular distances between said guide lines and said signature points, and designating a new start point whenever one of said perpendicular distances is in excess of a predetermined maximum value.

8. A method according to claim 2 wherein the last previously designated stop point is designated as the new start point.

9. A method according to claim 8 wherein data for all points between adjacent start points is discarded.

10. A method according to claim 6 wherein said sensing step is performed with a stylus-operated digitizer.

* * * * *